(12) United States Patent
Butterfield et al.

(10) Patent No.: US 11,140,203 B1
(45) Date of Patent: Oct. 5, 2021

(54) AMBIENT, AD HOC, MULTIMEDIA COLLABORATION IN A GROUP-BASED COMMUNICATION SYSTEM

(71) Applicant: Slack Technologies, Inc., San Francisco, CA (US)

(72) Inventors: Daniel Stewart Butterfield, San Francisco, CA (US); Tamar Yehoshua, San Francisco, CA (US); Noah Weiss, San Francisco, CA (US); Johnny Rodgers, Vancouver (CA); Kevin Marshall, Mill Valley, CA (US); Anna Niess, Hastings-on-Hudson, NY (US); Pedro Carmo, Brooklyn, NY (US); Ethan Eismann, Orinda, CA (US); Chris Willmore, Alameda, CA (US); David Ly-Gagnon, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 17/064,344

(22) Filed: Oct. 6, 2020

(51) Int. Cl.
*H04L 29/06* (2006.01)
(52) U.S. Cl.
CPC ........ *H04L 65/403* (2013.01); *H04L 65/1069* (2013.01); *H04L 65/1093* (2013.01)
(58) Field of Classification Search
CPC .............. H04L 65/403; H04L 65/1069; H04L 65/1093
See application file for complete search history.

(56) References Cited

U.S. PATENT DOCUMENTS

| | | | |
|---|---|---|---|
| 9,294,522 B1* | 3/2016 | Yeskel | H04L 67/02 |
| 10,560,662 B1 | 2/2020 | Tippana | |
| 2002/0122391 A1 | 9/2002 | Shalit | |
| 2012/0331402 A1* | 12/2012 | Hon | G06F 16/44 |
| | | | 715/756 |
| 2016/0028784 A1 | 1/2016 | Gupta et al. | |
| 2017/0142170 A1* | 5/2017 | Sylvain | H04L 65/1083 |
| 2017/0171253 A1* | 6/2017 | Pierce | H04L 65/1096 |
| 2017/0180485 A1* | 6/2017 | Lawson | H04L 65/403 |
| 2018/0287982 A1 | 10/2018 | Draeger et al. | |
| 2020/0301648 A1* | 9/2020 | Shi | A63F 13/87 |

OTHER PUBLICATIONS

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Khaled M Kassim
(74) *Attorney, Agent, or Firm* — Erise IP, P.A.

(57) ABSTRACT

Medium, method and system for ad hoc, ambient, synchronous multimedia collaboration in a group-based communication system. Embodiments of the invention provide a way for users to quickly and start a real-time collaboration among a group of peers without the burden and overhead of a conventional call or video meeting. Users can quickly and easily join and leave these synchronous multimedia collaboration sessions at any time, without disrupting the session for other users. This enables the user to experience the collaboration as a convenient forum rather than a burdensome scheduled event.

20 Claims, 5 Drawing Sheets

(56) References Cited

OTHER PUBLICATIONS

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Ernie Smith, "Picking Up The Slack", Tedium, [online][retrieved May 9, 2019], Retrieved from the Internet: <URL: https://tedium.co/2017/10/17/irc-vs-slack-chat-history/>. (dated Oct. 17, 2017) 13 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications-", Fujitsu Sci. Tech J., 36, 2, (Dec. 2000) 154-161.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield On How Slack Became A $2.8 Billion Unicorn", Forbes, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.
WIPO Application No. PCT/US2020/065356, International Search Report and Written Opinion of the International Searching Authority, dated Jun. 8, 2021.
Wikipedia; Clubhouse (app); https://en.wikipedia.org/wiki/Clubhouse_(app); Jul. 14, 2021; pp. 1-14.
Twitter, Inc.; About Twitter Spaces; https://help.twitter.com/en/using-twitter/spaces; Jul. 15, 2021; pp. 1-23.
"Beginner's Guide to Discord," https://support.discord.com/hc/en-us/articles/360045138571-Beginner-s-Guide-to-Discord, pp. 1-13, retrieved Mar. 3, 2021.
"Sending Messages," https://support.discord.com/hc/en-us/articles/360034632292-Sending-Messages, pp. 1-7, retrieved Mar. 3, 2021.
"How do I join a Server?" https://support.discord.com/hc/en-us/articles/360034842871-How-do-I-join-a-Server-, pp. 1-5, retrieved Mar. 3, 2021.

* cited by examiner

AMBIENT, AD HOC, MULTIMEDIA COLLABORATION IN A GROUP-BASED COMMUNICATION SYSTEM

TECHNICAL FIELD

Embodiments of the invention generally relate to multimedia communication, and more particularly, to ad hoc, synchronous, multimedia collaboration in a group-based communication system.

Traditionally, non-in-person collaboration has been divided into asynchronous communication (such as emails and group-based messaging), where a recipient may view a message minutes, days, or months after the sender sends it, and synchronous communication (such as phone calls and video meetings) which occur in real time but must be scheduled in advance. None of these formats can replicate the kind of serendipitous conversations that happen naturally in physical offices. As such, what is needed is ambient, ad hoc, multimedia collaboration that lowers the barrier for spontaneous, real-time collaboration.

SUMMARY

Embodiments of the invention address the above-described need by providing for ambient, ad hoc multimedia collaboration in a group-based communication system. In some embodiments, the group-based communication is a channel-based messaging platform. In particular, in a first embodiment, the invention includes one or more non-transitory computer-readable media storing computer-executable instructions that, when executed by a processor, perform a method of presenting a user interface for synchronous multimedia collaboration in a group-based communication system, the method comprising: displaying, in the user interface for the group-based communication system, asynchronous message data in a channel-specific message pane associated with a channel of the group-based communication system, responsive to receiving an instruction, from a user of the group-based communication system and via the user interface, an instruction to initiate a synchronous multimedia collaboration session, establishing the synchronous multimedia collaboration session between a plurality of participants, the participants being members of the channel of the group-based communication system, wherein the participants can freely leave and enter the synchronous multimedia collaboration session without disrupting the synchronous multimedia collaboration session, and displaying a synchronous collaboration pane the user interface for the group-based communication system, the a synchronous collaboration pane displaying a plurality of participating channel members.

In a second embodiment, the invention includes a method of presenting a user interface for synchronous multimedia collaboration in a group-based communication system, the method comprising displaying, in the user interface for the group-based communication system, asynchronous message data in a channel-specific message pane associated with a channel of the group-based communication system, responsive to receiving an instruction, from a user of the group-based communication system and via the user interface, an instruction to initiate a synchronous multimedia collaboration session, establishing the synchronous multimedia collaboration session between a plurality of participants, the participants being members of the channel of the group-based communication system, wherein the participants can freely leave and enter the synchronous multimedia collaboration session without disrupting the synchronous multimedia collaboration session, and displaying a synchronous collaboration pane in the user interface for the group-based communication system, the synchronous collaboration pane displaying a plurality of participating channel members.

In a third embodiment, the invention includes a system for presenting a user interface for synchronous multimedia collaboration in a group-based communication system, the system comprising a group-based communication system server, a real-time media server communicatively coupled to the group-based communication system server; a group-based communication system client device associated with an initiating user; and a plurality of participant group-based communication system client devices associated with a respective plurality of members of a channel of the group-based communication system, wherein the group-based communication system client device associated with the initiating user is programmed to: display, in a user interface for the group-based communication system, asynchronous message data in a channel-specific message pane associated with the channel of the group-based communication system, responsive to receiving an instruction, from the initiating user and via the user interface, an instruction to initiate a synchronous multimedia collaboration session: establish the synchronous multimedia collaboration session between the plurality of participant group-based communication system client devices via the real-time media server, wherein the members of the channel can freely leave and enter the synchronous multimedia collaboration session without disrupting the synchronous multimedia collaboration session; and display a synchronous collaboration pane in the user interface for the group-based communication system, the synchronous collaboration pane displaying the plurality of members of the channel of the group-based communication system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
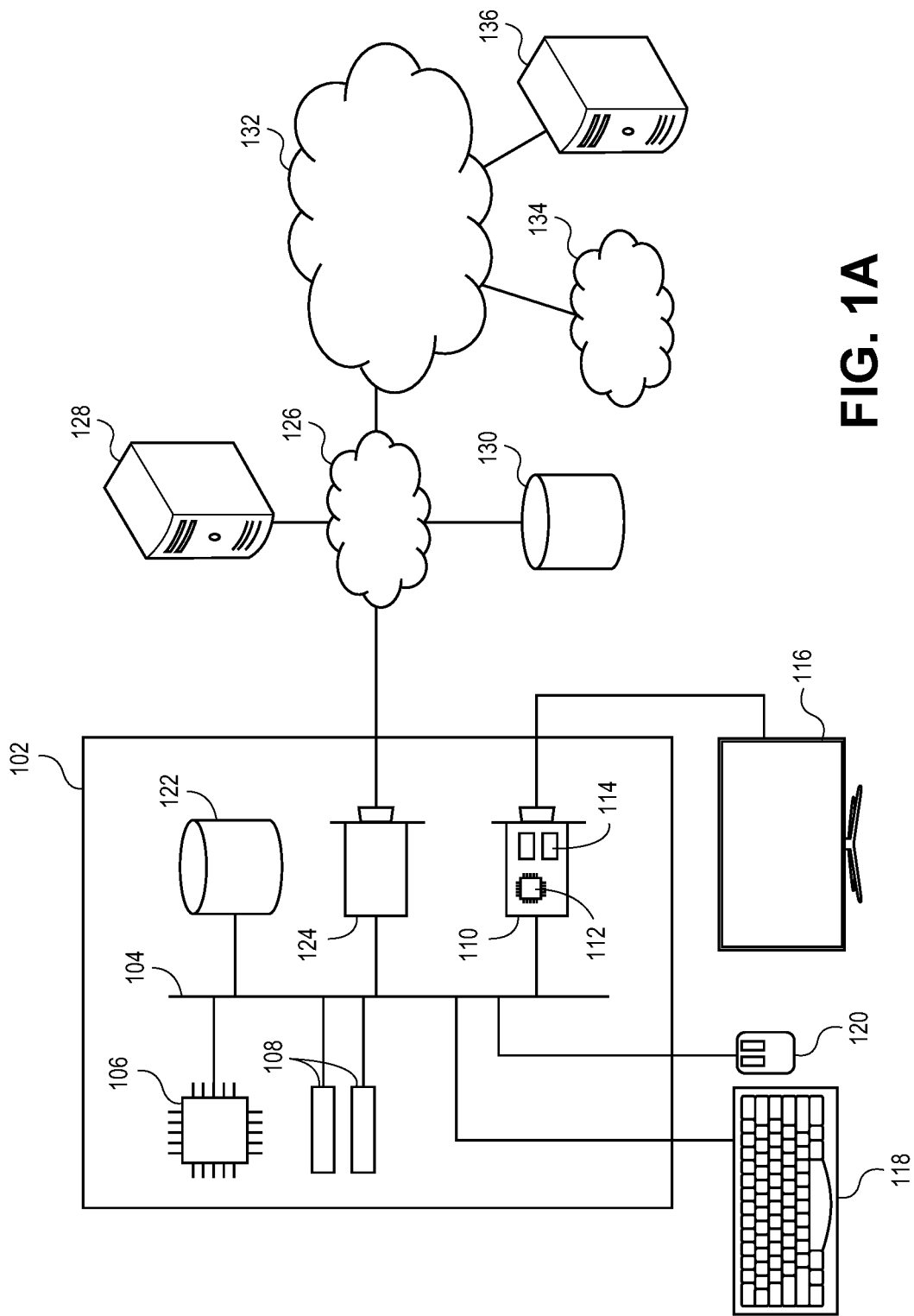
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention provide for ad hoc, ambient, synchronous, multimedia collaboration. In contrast to conventional audio or video calls, which typically are scheduled with a defined start and end time, embodiments of the invention foster collaboration among users by lowering the barrier to real-time communication, thereby creating opportunities for serendipitous conversations. Users can quickly and easily join and leave these synchronous multimedia collaboration sessions at any time, without disrupting the session for other users. This enables the user to experience the collaboration as a convenient forum rather than a burdensome scheduled event. The ambient nature of such a collaboration space allows users to feel connected to other team members without the need for physical proximity or artificial check-ins.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media, and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
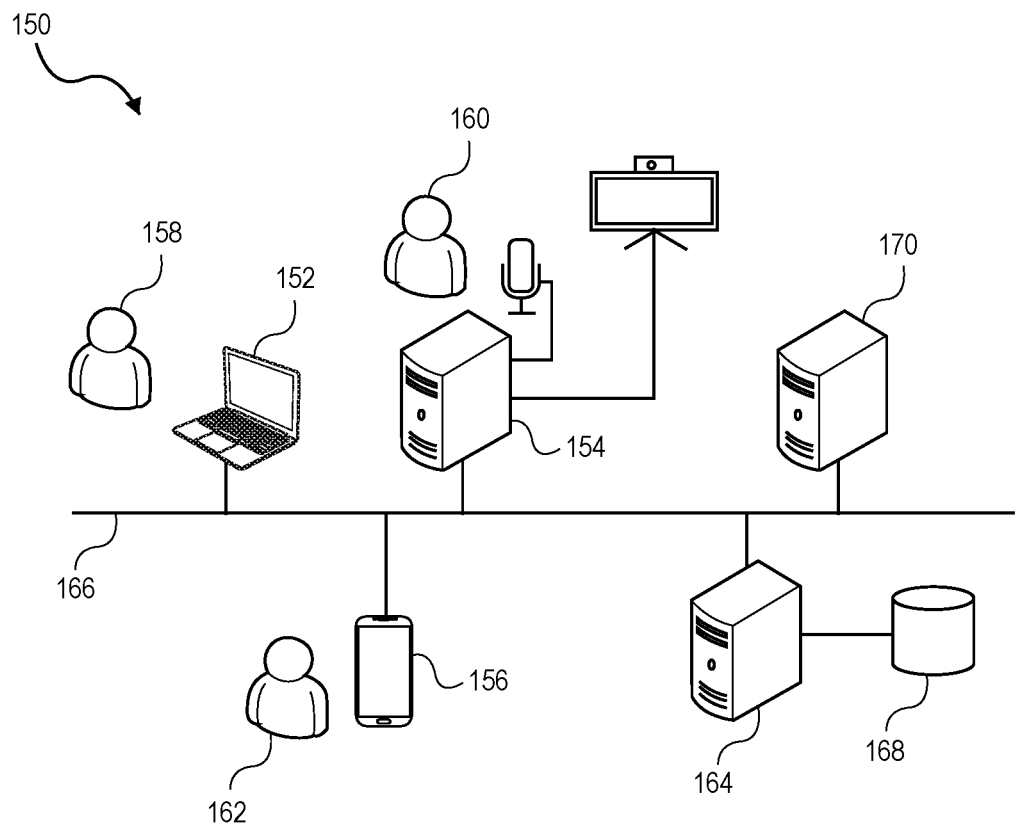
FIG. 1B depicts a system figure illustrating the elements of a system for carrying out embodiments of the invention.

Turning now to FIG. 1B, a system figure illustrating the elements of a system for carrying out embodiments of the invention is depicted and referred to generally by reference numeral 150. System 150 includes any number of client devices such as client device 152, client device 154, and client device 156 associated with user 158, user 160, and user 162 respectively. Although system 150 is depicted with one client device per user, an individual user may connect to the group-based communication system using multiple client devices, either concurrently or sequentially. Similarly, in some embodiments, multiple users may share (concurrently or sequentially) a single client device to access the group-based communication system. As depicted in FIG. 1B, client devices may be any form of computing device discussed above with respect to FIG. 1A. In particular, a user may access the group-based communication system using a desktop, a laptop, or a mobile device. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some embodiments, the group-based communication system is a channel-based messaging platform.

The group-based communication system is hosted by group-based communication system server 164. Group-based communication system server 164 may be a dedicated server, a shared server, a virtual machine instance in a cloud computing environment, or any other form of computing device discussed above with respect to FIG. 1A. Although a single group-based communication system server 164 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons. Server 164 is communicatively coupled to client devices 152, 154, and 156 via network 166. Network 166 may be a local area network (LAN), wide-area network (WAN), virtual private network (VPN) or the Internet. Broadly speaking, any type of network for providing communication between the various components of system 150 is contemplated. Group-based communication system server 164 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 168 is communicatively connected to group-based communication system server 164. As depicted, group-based communication system data store 168 is directly connected to group-based communication system server 164; however, any form of communicative connection (for example, network-attached storage (NAS), a network file system (NFS), or cloud-based storage) can be employed. Broadly speaking, group-based communication system data store 168 stores the all of the durable information used by group-based communication system server 164. For example, group-based communication system data store 168 may store all of the messages with their associated channels, documents and images uploaded to particular channels, channel membership information, and/or user information. In some embodiments, when collaboration sessions are archived (as described in greater detail below), the archived collaboration system data is stored on group-based communication system data store for subsequent retrieval. As previously discussed, multiple group-based communication system servers may be present in system 150. In such embodiments, each group-based communication system server may have its own copy of group-based communication system data store 168. Alternatively, multiple group-based communication system servers may share a single network-attached group-based communication system data store. Alternatively or in addition, in any of these embodiments, data may be sharded across multiple group-based communication system data stores.

Real-time media server 170 is also communicatively coupled to group-based communication system server 164 and client devices 152, 154 and 156. Real-time media server manages the multimedia aspects of real-time multimedia collaboration sessions among users of the group-based communication system as described in additional detail below. The term "multimedia" is used in this specification for brevity; however, it should be understood that the term used herein contemplates audio-only streams, video-only streams, audio/video streams, or any other combination of one or more media streams.

As depicted, the communication between real-time media server is via network 166. In some embodiments, however, the real-time nature of collaboration sessions may be better served by connecting via a different network for part or all of the communicative coupling. For example, a particular client device may normally connect to group-based communication system server 164 via a cellular data connection but switch to a WiFi connection when a multimedia collaboration session begins to accommodate an additional demand for bandwidth. In some embodiments, client devices may communicate multimedia collaboration data with each other via real-time media server 170 using a hub-and-spoke configuration. In other embodiments, client devices may communicate with each other directly using a peer-to-peer or supernode architecture. In still other embodiments, client devices on the same network may communicate with each other using multicast network protocols such as IP multicast. In yet other embodiments, media communication between the client devices may be via an edge-based scaling content distribution network.

Figure 2A:
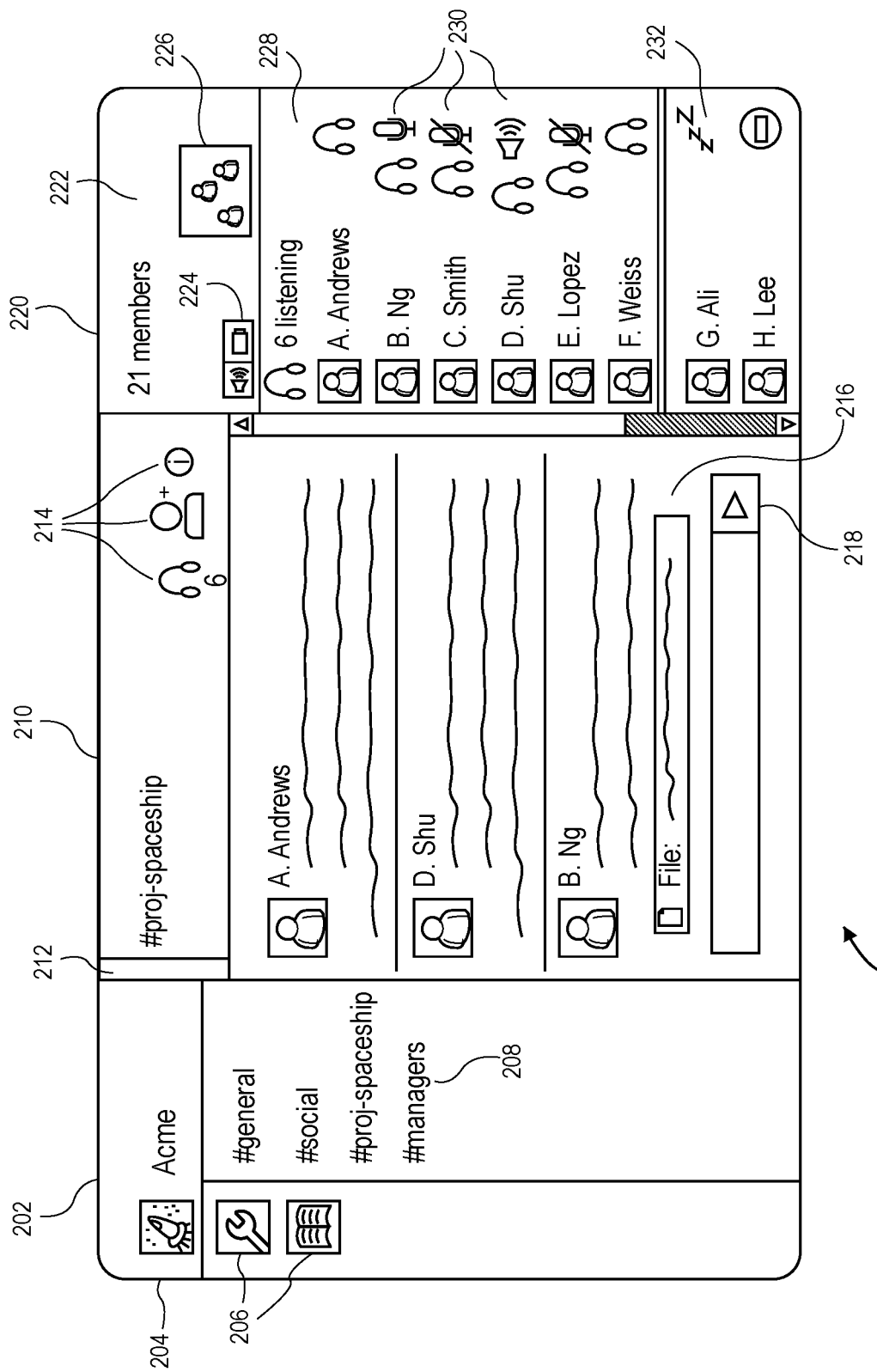
FIG. 2A depicts a user interface depicting a first use case of one embodiment of the invention.

Turning now to FIG. 2A, a user interface depicting a first use case of one embodiment of the invention is depicted and referred to generally by reference numeral 200. User interface 200 depicts a channel in a group-based communication system for asynchronous collaboration among a group of users (also known as members of the channel). Users of the group-based communication system can post messages at any point in time, and other members can view them at their leisure, either in real time or when they next visit the particular channel of the group-based communication system. This has the advantage that users can focus on particular tasks without being distracted by the need to constantly monitor real-time communications. In such systems, the addition of synchronous collaboration sessions can help improve team integration and collaboration. For example, a regularly scheduled, real-time sync session can help team members better understand what their coworkers are working on.

However, formally organized and structured meetings are a poor vehicle for collaboration. Users feel pressured to set aside time for the meeting, prepare for it, and devote their entire attention to the predetermined meeting topic. By contrast, embodiments of the invention allow users to collaborate ambiently, as if they were working together in the same room, but without the need for physical proximity. Integrating such ambient collaboration into the group-based communication system further has the benefits of reducing the barrier to initiating a collaboration. Rather than being required to propose a meeting, confirm availability, choose a time, and send invitations, a user can simply start a collaboration with members of the channel with a single button press. Channel members who are available can join the collaboration, join in listen-only mode, or decline to join. In some embodiments, members may join and leave the collaboration session at any point in time the session is active.

As depicted, user interface 200 includes a navigation pane 202 for navigating the group-based communication system. For example, navigation pane 202 may include an organization label 204 with one or more workspace labels to allow the user to switch between different organizations using the group-based communication system and different workspaces within an organization. For example, a user may belong to one instance of the group-based communication system associated with their employer and a second instance associated with a volunteer organization to which the user belongs. Within the employer's organization, separate workspaces may exist for product development and product support. The user can switch between organizations by clicking on the organization label 204 and switch between workspaces with the selected organization using workspace labels 206. Finally, within a workspace, communications may be divided up into channels, with each channel devoted to a particular topic. In some embodiments, user interface 200 includes a list of channels 208 to which the user has subscribed or to which the user has access, and the user can switch the current channel view to any channel by selecting that channel in the list. In some embodiments, channel list 208 may include an icon indicating that a particular channel (or channels) has an ongoing multimedia collaboration session. Thus, navigation page 204 allows a user to easily select a channel across different organizations and workspaces.

Next, user interface 200 includes channel display 210. Channel display 210 includes information relevant to the user's currently selected channel. For example, channel display 210 may include channel header 212, which displays metadata for the currently selected channel, including channel name, channel membership, and channel topic. Channel header 212 may also include controls 214 for starting a multimedia collaboration session, adding new members to the channel, displaying additional information about the channel, administering the channel, or other channel functions. In some embodiments, controls 214 for starting the multimedia collaboration session may be located elsewhere in navigation pane 202 or from a message compose user interface 218 or compose button located in navigation pane 202. In some embodiments, controls 214 further select a sidebar pane (such as multimedia collaboration session pane 220, discussed in further detail below). In some embodiments, the controls display additional information when the user hovers over them. For example, the "multimedia session" control 214 might display a list of members in an ongoing multimedia collaboration session if the user hovers over it, even when multimedia collaboration session pane 220 is not displayed. Channel display 210 further includes message display 216, which displays the messages posted in the channel by the members of the channel, notifications for the channel, and other channel data. As depicted, message display 216 shows the most recent messages posted by channel members; however, in some embodiments, messages may be searchable, sortable, and/or scrollable within message display 216. Finally, message display 216 may include a message input box 218 allowing users to post messages to the message display for communication to other channel members.

User interface 200 may also selectively display a sidebar pane responsive to user actuation of controls 214. As depicted, multimedia collaboration session pane 220 is depicted, as it might be if a user had selected the "multimedia session" control 214. Controls 214 may include useful information that may be updated in real time. For example, as depicted, "multimedia session" control 214 shows a "6," indicating that six users are currently participating in the multimedia collaboration session. Similarly, the "add user" control might show a current number of users in the channel. The icon itself might also change to reflect a type of multimedia. For example, if the multimedia type for the multimedia collaboration session changes from audio-only to audio/video, the headphones icon might change to a camera icon. Similarly, a projector screen icon might be shown for a screen share session, or a file icon might be shown for a file sharing session. Multimedia collaboration session pane 220 includes a multimedia collaboration session control header 222 with controls for controlling the multimedia collaboration session. For example, as depicted, multimedia collaboration session control header 222 includes a multimedia type control 224 and a begin multimedia collaboration session control 226. In some embodiments, the multimedia type control 224 allows users to select or change a particular type of multimedia collaboration. For example, a user might be able to select from audio-only, audio/video, screen share, scratch pad/whiteboard, file share, or any other type of multimedia session. In some embodiments, a "talking heads" multimedia session is available including audio and a small, headshot-only video, image, or animation for the speaker. Non-speaking users may be represented with just the user's profile icon.

In some embodiments, once a multimedia collaboration session has started, a user can use multimedia type control 224 to change to a different type of multimedia session without interrupting the ongoing session. For example, a user may upgrade the multimedia session from audio-only to audio/video (or audio/screen share) or downgrade the multimedia session from audio/video to audio-only. In other embodiments, users can only upgrade ongoing multimedia sessions to add additional media stream types. In some embodiments, a recording control may further be provided for the entire multimedia session or an individual media stream of the multimedia stream to toggle recording of a portion or all of the multimedia collaboration session In some embodiments, begin multimedia collaboration session control 226 allows any user to begin a multimedia collaboration session if one is not already in progress. In other embodiments, only selected users (for example, managers or channel administrators) can start multimedia collaboration sessions. In some embodiments, only channel members with the appropriate permissions may start a multimedia collaboration session. In some embodiments, only members of the channel or members of a first organization of a multi-organization channel can start a multimedia collaboration session. In some embodiments, anyone in the organization, workspace, or channel can join the multimedia collaboration session. In some embodiments, only channel members of a first organization can join the multimedia collaboration session. In some embodiments, non-channel members who have the appropriate permissions (e.g., user who belong to the same organization or same workspace) may join the multimedia collaboration session. In some embodiments, begin multimedia collaboration session control 226 ends a multimedia session if it is actuated during an ongoing multimedia session. For example, if a user in a multimedia collaboration session actuates the control, the session may be ended or the user might leave the collaboration session without ending the session for the other participants. In some embodiments, if there is an ongoing multimedia collaboration session which the user has not joined, begin multimedia collaboration session control 226 may add the user to that collaboration session upon actuation. In some embodiments, begin multimedia collaboration session control 226 changes appearance based on whether there is an ongoing multimedia collaboration session and whether use user is currently joined to that session. The user may join or leave the session as many times the user wants as long as the multimedia collaboration session is live. In some embodiments, the user who initiated a multimedia collaboration session may be the owner of that multimedia collaboration session. If the user who is the owner of the session leaves the multimedia collaboration session, ownership of the session may be transferred to another user. In some embodiments, the multimedia collaboration session remains live as long as one or more user remained joined to the session.

In some embodiments, a multimedia collaboration session is tied to a channel such that any active user (e.g., a user currently viewing the channel) is joined to the multimedia collaboration session. For example, if a user in a particular channel starts a multimedia collaboration session, all users currently viewing the channel may be added to the collaboration session. In some embodiments, they are added to the session in receive-only mode (for example, muted and with the camera off) to preserve privacy.

In some embodiments, users may be able to pre-configure auto-join preferences determining whether (and in what capacity) they are automatically joined to multimedia collaboration sessions on entering a channel or on session initiation. For example, a first user might specify that they wish to automatically join all multimedia collaboration sessions, a second user might specify that they wish to join newly created multimedia collaboration sessions in receive-only mode, a third user might specify that they never wish to automatically join multimedia collaboration sessions, and a fourth user might specify that they wish to join newly-created multimedia collaboration sessions in receive-only mode and join multimedia collaboration sessions in send/receive mode upon channel switching only if they were in a multimedia collaboration session in the previous channel prior to switching. In some embodiments, the permissions for users determine how they initiate and/or join multimedia collaboration sessions. In some embodiments, these permissions are set up by an administrator of the organization. A person of ordinary skill in the art, upon reviewing this disclosure, will appreciate that many other configurations for automatically joining multimedia collaboration sessions are possible as well, and all such configurations are contemplated as being within the scope of the invention.

If a participating user leaves the first channel (for example, by selecting a second channel in channel list 208), they may be disconnected from the multimedia collaboration session associated with the first channel and joined to any ongoing multimedia collaboration session in the second channel. Similarly, if a user begins viewing a channel (by selecting that channel or logging on to the group-based communication system) they may be automatically be joined to an in-progress multimedia collaboration session if one exists. In some embodiments, only one multimedia collaboration session may be enabled for a given channel at one time. In some embodiments, multiple multimedia collaboration sessions may be simultaneously live in the same channel. In some embodiments, a user may switch between multiple multimedia collaboration sessions without being disconnected from any of the joined multimedia collaboration sessions.

In some embodiments, multimedia collaboration session pane 220 further displays participant list 228. Participant list 228 may display the members of the channel and their current participation status. For example, when no multimedia collaboration session is in progress, one or more status icons 230 may be displayed for each user indicating presence (for example, whether the user is active, idle, logged off, or busy). When a multimedia collaboration session is in progress, participant list 228 may be subdivided into joined users 228 and un-joined users 232. For joined users 228 during a multimedia collaboration session, status icons 230 may be changed to indicate the capacity (e.g., muted/unmuted or video on/off) in which the associated user has joined the call. In some embodiments, a summary indicating the number of joined users may be displayed in the multimedia collaboration session pane. In some embodiments, the multimedia collaboration session pane may further display a topic for the multimedia collaboration session.

For example, user interface 200 depicts an ongoing audio-only collaboration session. In some embodiments, information may be shown in multimedia collaboration session pane 220 summarizing the participant in the multimedia collaboration session. For example, as depicted, the headphones icon shows that six channel members are currently participating in the multimedia collaboration session. This information may be updated in real time. As depicted, some users have joined the audio collaboration session in send-receive mode (as indicated by the headphones and microphone icon), some users have joined the audio collaboration session in send-receive mode but are muted (as indicated by the headphones and the struck-through microphone) and some users have joined the collaboration session in receive-only mode as indicated by the headphones icon with no microphone icon. Additional icons may indicate who is currently speaking (as depicted, the speaker icon). A person of skill in the art, reviewing this disclosure, will appreciate that other icons can be used for other types of multimedia collaboration session and participation (for example, a camera icon for users participating in a video collaboration session or a display icon for users in a screen-sharing collaboration session). A person of ordinary skill in the art will further appreciate that these icons can be combined to represent the various media streams in a multimedia collaboration session. For example, one user might be sharing video while other users collaborate on a whiteboard and a third user speaks. Non-joined users may display an icon indicating a reason why they are not joined (for example, if they are away from their computer or busy in a meeting). In some embodiments, a nudge control (not displayed) may be present for non-joined users to allow a joined user to request that the non-joined user join the multimedia collaboration session. In some embodiments, in response to a joined user activating the nudge control, the non-joined, nudged user may be joined to the multimedia collaboration session without the non-joined, nudged user having to take affirmative action to join the multimedia collaboration session. In some embodiments, the non-joined user may receive a notification notifying the non-joined user that they have been invited to join the multimedia collaboration session. In some embodiments, the notification may include a button to join the non-joined user to join or decline the multimedia collaboration session.

In some embodiments, users may react to the speaker by selecting an emoji to react to the speaker in real time. In some embodiments, the selected emojis are displayed next to the speaker's icon or the reacting user's icon. In some embodiments, the selected emojis are ephemeral and disappear once displayed in multimedia collaboration session pane 220 for a predetermined period of time. In some embodiments, the selected emoji is displayed next to the appropriate user's icon. In some embodiments, the emoji may be displayed instead or in addition in multimedia collaboration session window 234 (discussed below). In some embodiments, multimedia collaboration session window 234 includes emojis that have been selected with a count representing the number of times each emoji has been selected.

Figure 2B:
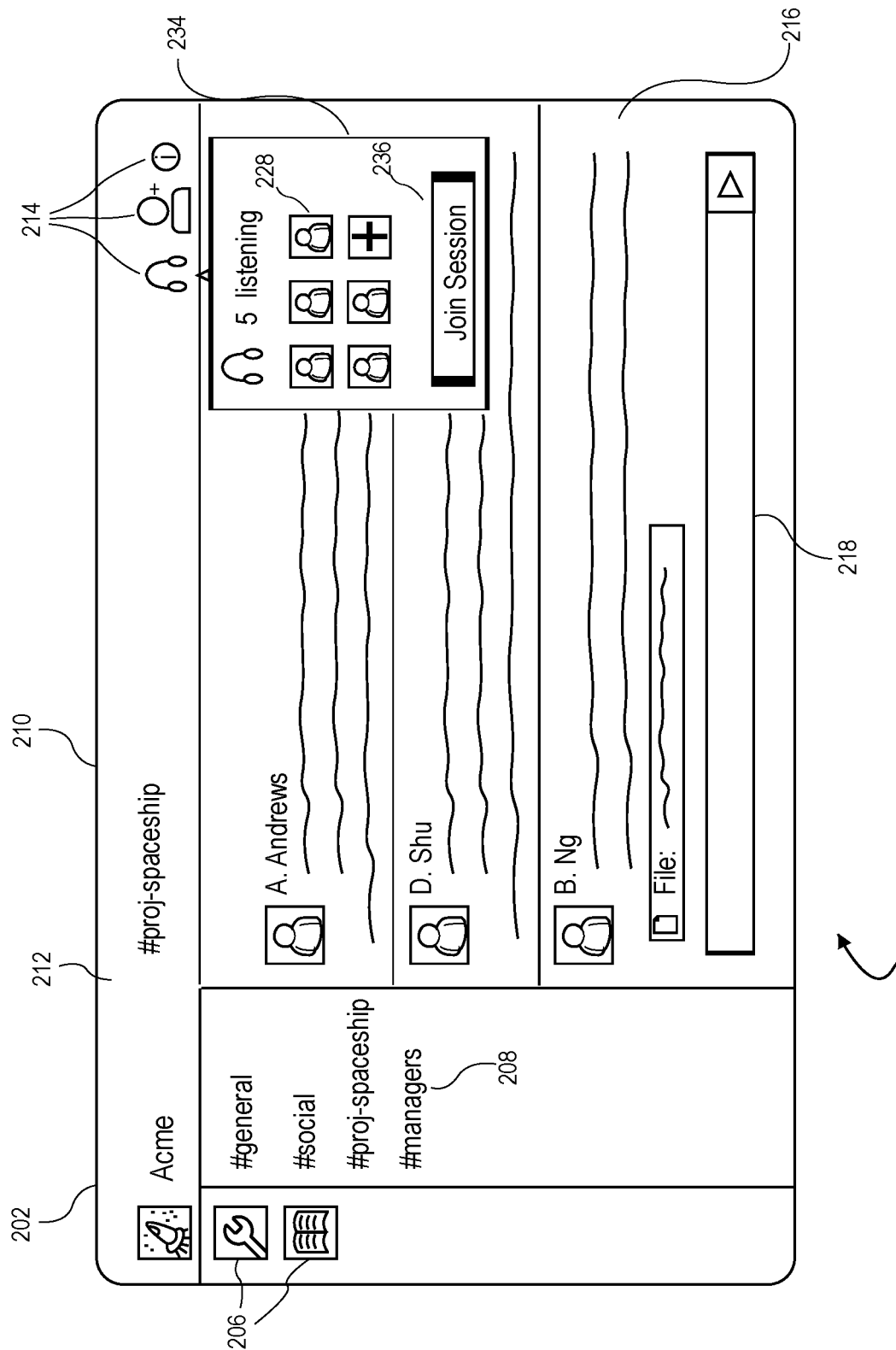
FIG. 2B depicts a user interface depicting a second use case of one embodiment of the invention.

Turning now to FIG. 2B, a second view of user interface 200 depicting a second case of one embodiment of the invention is depicted. Where common features or elements are unchanged, they are not discussed separately from their description with respect to FIG. 2A. In FIG. 2B, multimedia collaboration session pane 220 has been popped out into multimedia collaboration session window 234. In some embodiments, multimedia collaboration session window 234 is overlayed over a portion of channel display 210 (such as, for example, over message display 216) in user interface 200 when multimedia collaboration control 214 is selected. In such embodiments, clicking the multimedia collaboration control 214 once multimedia collaboration session window 234 is overlayed causes multimedia collaboration session window 234 to close. In some embodiments, multimedia collaboration session window 234 can be re-docked as multimedia collaboration session pane 220 anywhere in in user interface 200. For example, multimedia collaboration session window 234 can be re-docked as multimedia collaboration session pane 220 on the right side of the user interface (as shown in FIG. 2A) or left of navigation pane 202. Alternatively, multimedia collaboration session window 234 can remain as a separate undocked window and positioned anywhere in user interface 200. In some embodiments multimedia collaboration window 234 appears when the user hovers over (or clicks on) the "multimedia session" control 214 when the multimedia collaboration session pane 220 is not displayed.

As shown, multimedia collaboration session window 234 depicts a collapsed view of the multimedia collaboration session, showing only user icons for the joined users, a "join session" button 236 and summary information for the multimedia collaboration session (for example, an icon representing the multimedia type). In other embodiments, more or less information may be shown in multimedia collaboration session window 234, or multimedia collaboration session window 234 may show the same information as multimedia collaboration session pane 220. In some embodiments, multimedia collaboration session information or notifications may be shown in navigation pane 202 instead or in addition.

For example, a multimedia collaboration section may be added above or below channel list 208 in a notifications section showing multimedia collaboration session updates for the user, including the user's active session, any unjoined sessions in channels to which the user belongs, and any nudge notifications that the user has been invited to join a session. In some embodiments, the notifications section in the navigation pane including the multimedia collaboration section may be collapsed when not in use.

Figure 3:
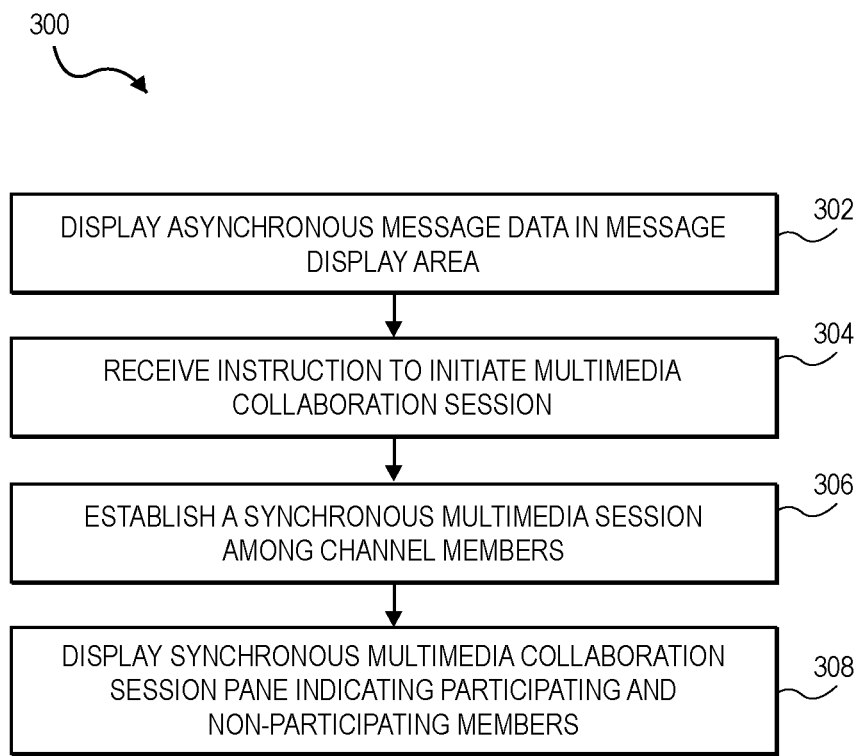
FIG. 3 depicts a flowchart illustrating the operation of a method in accordance with embodiments of the invention.

Turning now to FIG. 3, a flowchart illustrating the operation of a method in accordance with embodiments of the invention is depicted and referred to generally by reference numeral 300. Initially, at a step 302, asynchronous message data is displayed in a message display area of the user interface of a group-based communication system. As used herein, "asynchronous message data" includes data (such as textual content, files, images, or replies/reaction data) that is posted by one user and can be viewed by one or more other users an arbitrary amount of time later. In some embodiments, the message display area is a channel-specific message display area for messages posted in a particular channel of the group-based communication system. In some such embodiments, only members of the channel can post in the channel and/or view messages posted in the channel.

Next, at step 304, an instruction is received, from a user and via the user interface, to initiate a multimedia collaboration session. For example, the user may select control 226 in multimedia session pane 220 to initiate the multimedia collaboration session. In some embodiments, any user of the group-based communication can initiate a multimedia collaboration session. In other embodiments, only specific users or users with a particular permissions level can initiate a multimedia collaboration session. In still other embodiments, only users who are members of a channel can initiate a multimedia collaboration session in that channel. In some embodiments, a user may indicate a type of multimedia for the multimedia collaboration session. For example, the user may select audio-only or audio-video. In some embodiments, the multimedia collaboration session is initiated immediately. In other embodiments, the user may additionally specify a delayed start for the multimedia collaboration session. For example, the user might indicate that the multimedia collaboration session should start in one minute, two minutes, three minutes, or five minutes to allow other participants a chance to prepare.

Processing then proceeds (after the specified delay interval, if indicated) to step 306. At step 306, the group-based communication system establishes a synchronous multimedia collaboration session among the channel members. As used herein, the term "synchronous multimedia" refers to the real-time or substantially real-time exchange of multimedia content among the session participants. Examples of synchronous multimedia include voice and video calls, streaming screen sharing, and collaborative whiteboarding or scratch padding. In contrast, examples of asynchronous multimedia include previously recorded content such as recorded video or podcasts that users may access at any point in time after the content has been recorded or posted. In some embodiments, all active (or all users regardless of active status) members of the channel members are added to the synchronous multimedia collaboration session. In some such embodiments, channel members are added in receive-only mode. In other embodiments, each channel member is added, not added, or added in receive-only mode based on a preconfigured preference of the user. In still other embodiments, users are prompted for a join mode when the synchronous multimedia collaboration session is established and can choose to receive only or send and receive for each media type in the synchronous multimedia collaboration session.

In addition to users automatically joined to the session (or who choose to join the session when prompted upon creation), users may join (or leave) the synchronous multimedia collaboration session at any point during the session. In particular, in some embodiments, users may automatically be joined to (or be automatically prompted to join) the synchronous multimedia collaboration session when they select the associated channel for viewing in the group-based communication system. Similarly, in some embodiments, users may automatically be removed from the synchronous multimedia collaboration session (or be prompted to leave) upon viewing a different channel in the group-based communication system. In this way, the synchronous multimedia collaboration session provides ad hoc, ambient audio (or other multimedia content, such as a shared whiteboard) to the channel, enhancing spontaneous collaboration between channel members.

Additionally, at step 308, a synchronous multimedia collaboration session pane is displayed in the user interface. This pane may be displayed before step 302, after step 306, or at any other point in the process. The synchronous multimedia collaboration session pane displays identifiers for a plurality of participating and non-participating users (for example, the participating and non-participating channel members). In some embodiments, the participating users are displayed so as to indicate whether each user is participating or non-participating. For example, participating users and non-participating users may be displayed separately. In some embodiments, participating users are shown in a first section and non-participating users are shown in a separate section. In some embodiments, users are displayed with one or more status icons to indicate a capacity in which each user had joined the synchronous multimedia collaboration session. In some embodiments, the synchronous multimedia collaboration session pane is updated in real time to reflect the state of the synchronous multimedia collaboration session as users join, leave, and switch between multimedia modes.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub combinations are of utility and may be employed without reference to other features and sub combinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method of presenting a user interface for synchronous multimedia collaboration in a group-based communication system, the method comprising:

displaying, in the user interface for the group-based communication system, asynchronous message data in a channel-specific message pane associated with a channel of the group-based communication system;

responsive to receiving, from a user of the group-based communication system and via the user interface, an instruction to initiate a synchronous multimedia collaboration session:

automatically establishing the synchronous multimedia collaboration session between a plurality of participants, the participants being members of the channel of the group-based communication system;

updating an indication in the channel-specific message pane of the user interface of the group-based communication system to indicate that the synchronous multimedia collaboration session is active, wherein the participants can leave and join the synchronous multimedia collaboration session without disrupting the synchronous multimedia collaboration session;

displaying a synchronous collaboration pane in the user interface for the group-based communication system, the synchronous collaboration pane displaying a plurality of participating and non-participating channel members in the synchronous multimedia collaboration session and a status for each of the plurality of channel members;

receiving a selection, from the user and via the user interface, of a new channel, the new channel being distinct from the channel;

displaying data associated with the new channel in the channel-specific message pane; and in response to receiving a second instruction to initiate a second synchronous multimedia collaboration session:

joining the second synchronous multimedia collaboration session associated with the new channel.

2. The media of claim 1, wherein the synchronous multimedia collaboration session is an audio-only collaboration session.

3. The media of claim 2, where the users are added to the audio-only collaboration session in receive-only mode, wherein the receive-only mode only enables users to listen.

4. The media of claim 1, wherein all of the active members of the channel are added to the synchronous multimedia collaboration session.

5. The media of claim 1, wherein all of the members of the channel are added to the synchronous multimedia collaboration session based on pre-configured auto-join preferences.

6. The media of claim 1, wherein the method further comprises displaying, in the channel-specific message pane, a notification of the initiation of the synchronous multimedia collaboration session.

7. The media of claim 1, wherein the method further comprises:

disconnecting the user from synchronous multimedia collaboration session associated with the channel.

8. A method of presenting a user interface for synchronous multimedia collaboration in a group-based communication system, the method comprising:

displaying, in the user interface for the group-based communication system, asynchronous message data in a channel-specific message pane associated with a channel of the group-based communication system;

responsive to receiving, from a user of the group-based communication system and via the user interface, an instruction to initiate a synchronous multimedia collaboration session:
automatically establishing the synchronous multimedia collaboration session between a plurality of participants, the participants being members of the channel of the group-based communication system;
updating an indication in the channel-specific message pane of the user interface of the group-based communication system to indicate that the synchronous multimedia collaboration session is active,
wherein the participants can leave and join the synchronous multimedia collaboration session without disrupting the synchronous multimedia collaboration session;
displaying a synchronous collaboration pane in the user interface for the group-based communication system, the synchronous collaboration pane displaying a plurality of participating and non-participating channel members in the synchronous multimedia collaboration session and a status for each of the plurality of channel members;
receiving a selection, from the user and via the user interface, of a new channel, the new channel being distinct from the channel;
displaying data associated with the new channel in the channel-specific message pane; and
in response to receiving a second instruction to initiate a second synchronous multimedia collaboration session:
joining the second synchronous multimedia collaboration session associated with the new channel.

9. The method of claim 8, wherein the synchronous multimedia collaboration session is an audio-only collaboration session.

10. The method of claim 9, where the users are added to the audio-only collaboration session in receive-only mode, wherein the receive-only mode only enables users to listen.

11. The method of claim 8, wherein all of the active members of the channel are added to the synchronous multimedia collaboration session.

12. The method of claim 8, wherein all of the members of the channel are added to the synchronous multimedia collaboration session based on pre-configured auto-join preferences.

13. The method of claim 8, wherein the method further comprises displaying, in the channel-specific message pane, a notification of the initiation of the synchronous multimedia collaboration session.

14. The method of claim 8 further comprising:
disconnecting the user from synchronous multimedia collaboration session associated with the channel.

15. A system for presenting a user interface for synchronous multimedia collaboration in a group-based communication system, the system comprising:
a group-based communication system server;
a real-time media server communicatively coupled to the group-based communication system server;
a group-based communication system client device associated with an initiating user;
and a plurality of participant group-based communication system client devices associated with a respective plurality of members of a channel of the group-based communication system,
wherein the group-based communication system client device associated with the initiating user is programmed to:
display, in a user interface for the group-based communication system, asynchronous message data in a channel-specific message pane associated with the channel of the group-based communication system;
responsive to receiving, from the initiating user and via the user interface, an instruction to initiate a synchronous multimedia collaboration session: automatically establish the synchronous multimedia collaboration session
between the plurality of participant group-based communication system client devices via the real-time media server;
update an indication in the channel-specific message pane of the user interface of the group-based communication system to indicate that the synchronous multimedia collaboration session is active,
wherein the members of the channel can leave and join the synchronous multimedia collaboration session without disrupting the synchronous multimedia collaboration session;
display a synchronous collaboration pane in the user interface for the group-based communication system, the synchronous collaboration pane displaying a plurality of participating and non-participating channel members in the synchronous multimedia collaboration session and a status for each of the plurality of channel members;
receive a selection, from the user and via the user interface, of a new channel, the new channel being distinct from the channel;
display data associated with the new channel in the channel-specific message pane; and
in response to receiving a second instruction to initiate a second synchronous multimedia collaboration session:
join the second synchronous multimedia collaboration session associated with the new channel.

16. The system of claim 15, wherein the synchronous multimedia collaboration session is an audio-only collaboration session.

17. The system of claim 15, wherein all of the active members of the channel are added to the synchronous multimedia collaboration session.

18. The system of claim 15, wherein all of the members of the channel are added to the synchronous multimedia collaboration session based on pre-configured auto-join preferences.

19. The system of claim 15, wherein the group-based communication system client device associated with the initiating user is further programmed to: display, in the channel-specific message pane, a notification of the initiation of the synchronous multimedia collaboration session.

20. The system of claim 15, wherein the group-based communication system client device associated with the initiating user is further programmed to:
disconnect the initiating user from synchronous multimedia collaboration session associated with the channel without disrupting the synchronous multimedia collaboration session.

* * * * *